ated June 23, 1970

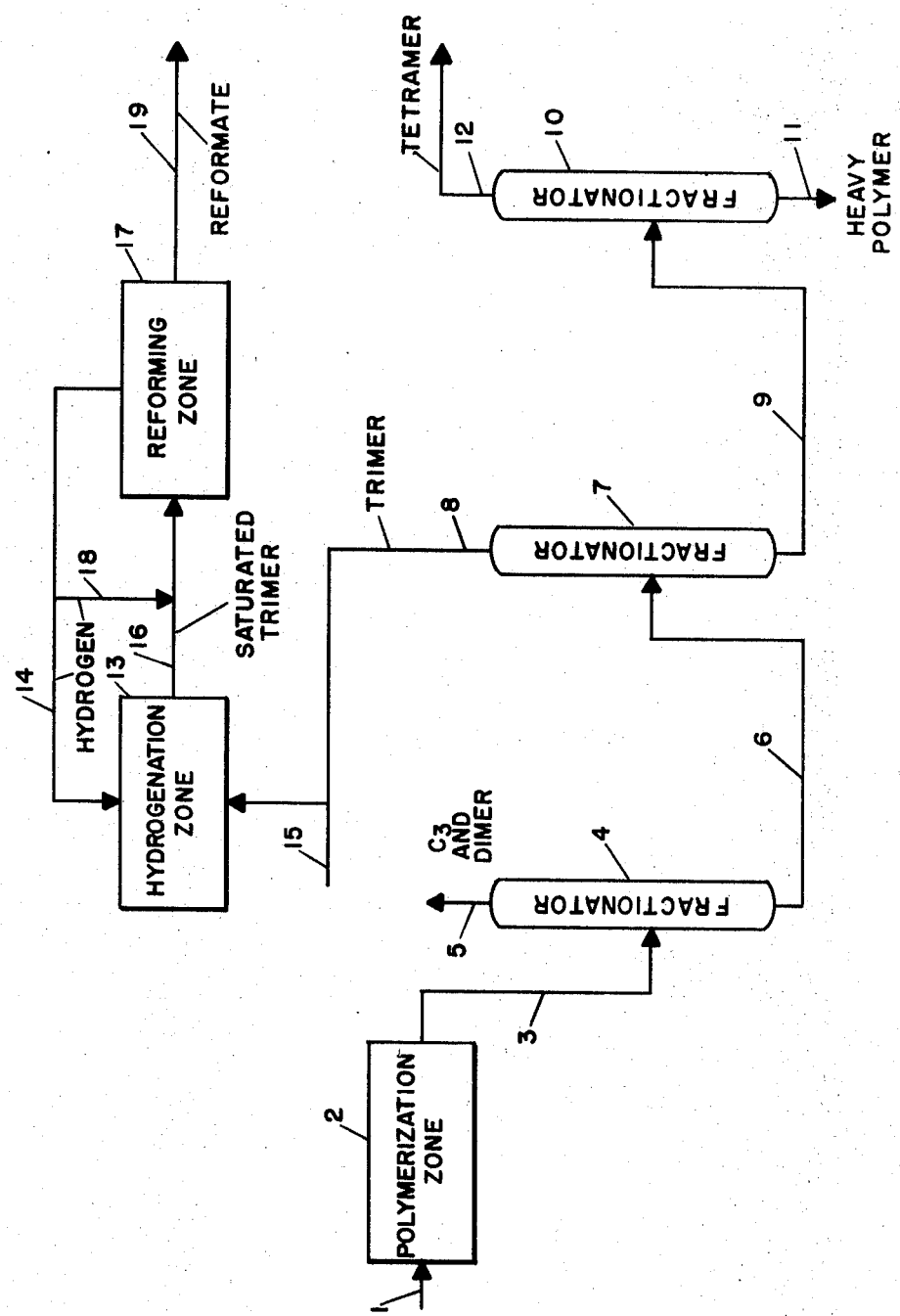

3,516,923
PROCESS FOR UPGRADING PROPYLENE
Merritt C. Kirk, Jr., Thornton, Pa., assignor to Sun Oil Company, Philadelphia, Pa., a corporation of New Jersey
Filed Sept. 27, 1968, Ser. No. 763,063
Int. Cl. C10g 39/00; C07c 5/04
U.S. Cl. 208—49                                                              6 Claims

ABSTRACT OF THE DISCLOSURE

This specification discloses a process for upgrading propylene into useful hydrocarbon products. In the process propylene is contacted with a phosphoric acid polymerization catalyst at polymerization temperatures to produce both trimer and tetramer products. The tetramer is useful in the manufacture of detergent alkylate. The trimer is upgraded into a high octane gasoline component by hydrogenation to effect saturation followed by reforming to produce $C_9$ aromatics.

---

The invention relates to an integrated process for the upgrading of propylene. Propylene trimer is produced as a by-product of propylene tetramer manufacture for detergent alkylate. The propylene trimer can be used in gasoline but has poor sensitivity and poor lead susceptibility. The present invention provides a process whereby propylene is upgraded into propylene tetramer useful for detergent alkylate and into $C_9$ aromatic hydrocarbons useful as high octane components in motor fuel.

By the present invention, propylene is polymerized to the tetramer which is used as detergent alkylate and into the trimer which is hydrogenated and then reformed into $C_9$ aromatics. The process comprises contacting a hydrocarbon consisting essentially of propylene with a phosphoric acid polymerization catalyst under polymerization conditions, separating from the polymerization reaction product a propylene tetramer fraction comprising $C_{12}$ olefins suitable for the preparation of detergent alkylate and a propylene trimer fraction comprising $C_9$ olefins, passing the propylene trimer fraction, in the presence of hydrogen, into contact with a hydrogenation catalyst to effect saturation of the trimer, passing the saturated trimer into contact with a reforming catalyst under reforming conditions to effect dehydrocyclization and aromatization of the trimer, and recovering the aromatized trimer suitable as a high octane component of motor fuel.

The polymerization of olefins in the presence of phosphoric acid catalysts is, of course, well known. Karchmer, U.S. Pat. 2,620,361 pertains to the polymerization of an alpha olefin using a phosphoric acid catalyst. The polymer produced is used as a gasoline blending agent or is hydrogenated for the production of detergents. Walkey, U.S. Pat. 2,852,579, teaches a two stage polymerization of propylene using a phosphoric acid catalyst. The ocnversion yields hydrocarbons boiling in the gasoline range to be used as gasoline blending stocks. Brooks, Pat. 2,802,890, discloses the polymerization of propylene using a phosphoric acid catalyst and the use of dimeric and trimeric products in motor fuels, and Toland, Pat. 2,870,217, concerns the preparation of high octane blends from the products of dimerization of trimerization of propylene. It has been observed that propylene trimer exhibits poor sensitivity and poor lead susceptibility when used in gasoline blending. Attempts to upgrade the trimer by direct reforming or cyclization result in cracking and polymerization. It has been found per the present invention that propylene trimer can be upgraded into a suitable gasoline blender by first subjecting the trimer to hydrogenation to effect saturation. This step is followed by dehydrocyclization to effect conversion of the saturated trimer into $C_9$ aromatics which can be used in gasoline.

The following detailed description of the invention is made with reference to the drawing which is a schematic representation of the integrated procedure of the present invention. In the drawing the feed in line 1 to the polymerization zone 2 generally is a refinery $C_3$ fraction containing propane in addition to propylene. Preferably the charge contains at least 25 percent propylene. Polymerization zone 2 contains a solid acid catalyst, such as orthophosphoric acid on a solid carrier. The essential ingredient of the solid catalysts which are employed in polymerizing olefins according to the present process is phosphoric acid, which in a majority of cases constitutes 80 percent or more of the catalyst mixture. Of the various acids of phosphorus, the orthophosphoric acid is generally preferred on account of its polymerizing ability, its cheapness and the readiness with which it may be procured. The invention is not restricted to the use of orthophosphoric acid, but can employ any of the other acids of phosphorus which will produce a reaction product comprising tetramers and trimers of the feed propylene.

The operation conducted in zone 2 can comprise any propylene polymerization known in the art. For example the process can comprise the sequential operation described in the Brooks Pat. 2,802,890 wherein the propylene charge stream is split into two fractions, one of which represents 50 to 95 percent of the charge. One fraction is reacted in a polymerization zone A which contains catalyst whose activity has become relatively low due to previous use. The effluent from zone A is combined with the second fraction of the charge and the mixture is reacted under specified conditions in a polymerization zone B which contains catalyst of relatively high activity. The operation in zone B produces mainly tetramer product. The sequential operation of the patent then further comprises: stopping the operation of zone A and replacing the catalyst therein with catalyst of relatively high activity while continuing the operation of zone B by reacting therein propylene charge alone under conditions to produce mainly dimer and trimer products, then operating zones A and B in parallel on propylene charge alone under conditions to produce mainly dimer and trimer products; then, when the catalyst activity in zone B has become relatively low, conducting the operation of zones A and B so that each operates in the manner of, and under the conditions specified for, the other zone in the first operation phase; and thereafter conducting the operation such that each of zones A and B operates in the manner of, and under the conditions specified for, the other zone in the second phase.

This sequential operation results in an efficient utilization of the polymerization capacity of a plant for producing given amounts of both tetramer for use in detergent manufacture and lower boiling polymers for use as motor fuel during a given time period.

The propylene charge stock to be polymerized in accordance with the Brooks patent generally is a refinery $C_3$ fraction containing propane in addition to propylene. Preferably the charge contains at least 25% propylene, but it is desirable that the propylene content of the feed to the reaction zones does not exceed 60%.

The product from polymerization zone 2 whether it be primarily tetramer or primarily dimer and trimer passes via 3 to fractionator zone 4 in which dimer products and $C_3$ hydrocarbons including propane and any unreacted propylene are removed overhead through line 5. The bottoms from fractionator zone 4 are sent through line 6 to fractionator zone 7 wherein trimer product is separated as a distillate stream which is removed through line 8 to be processed as hereinafter described. The residue from this second fractionation passes through line 9 to fractionation zone 10 for separation of heavy polymer 11 from tetramer product 12 which is suitable as a feedstock for the production of dodecylbenzene which is converted to detergent.

The trimer product from fractionator zone 7 is passed to hydrogenation zone 13 wherein the trimer is treated with hydrogen from line 14 and is saturated. The trimer can be hydrogenated in 13 and reformed in 17 as a single component, but it is preferred that the trimer feed in line 8 be mixed with a catalytically cracked gasoline from 15 and the mixture hydrogenated and reformed to produce hydrogenation of the olefinic gasoline along with the added trimer and a reformate of high octane rating. With this preferred embodiment the charge stock for the process is a full range catalytically cracked gasoline mixed with the propylene trimer. The gasoline is produced by contacting a cracking charge stock, for example, a straight run gas oil, at high temperature, e.g., 850° to 1000° F., with a cracking catalyst, such as a synthetic silica-alumina composite maintained in a fixed, fluidized or moving bed system. Usually a yield of 40 to 50 percent of olefinic gasoline is produced. The cracked gasoline product will boil in the range, for example, from 100° to 430° F. and will have an olefin content from 15 to 70 volume percent.

The mixture of the gasoline and trimer is charged into the hydrogenation zone 13 where the feed in admixture with hydrogen from 14 is contacted with a hydrogenation catalyst such as a catalyst composed of minor amounts of the oxides of cobalt and molybdenum supported on an alumina carrier. The hydrogenation conditions include, for example, a hydrogen concentration from about 1,000 to 10,000 standard cubic feet per barrel of hydrocarbon (abbreviated hereinafter as s.c.f./bbl.), a temperature of 500° to 800° F., a pressure of 200 to 800 pounds per square inch gauge (abbreviated hereinafter as p.s.i.g.), and space velocities of about 0.25 to about 5.0 pounds per hour per pound of catalyst. The hydrogenation treatment saturates substantially all of the olefins and desulfurizes the cracked gasoline. More specifically, the hydrogenation reduces the bromine number of the fraction treated to 5 or less and reduces the sulfur content to less than 0.01 weight percent.

The saturated product is withdrawn from zone 13 via 16 and passed to a catalytic reforming zone 17 wherein a conventional reforming is conducted in which the saturated product, in admixture with hydrogen from 18 in a concentration, for example, from about 1,000 to 20,000 s.c.f./bbl., is contacted at a temperature from 800° to 1050° F., a pressure from 250 to 1000 p.s.i.g., and a space velocity between about 0.25 to about 5.0 pounds per hour per pound of catalyst, with a reforming catalyst such as platinum on alumina, molybdenum oxide on alumina, or the like. The previous hydrogenation is effective to reduce the olefins and unsaturated trimer content of the feed to an extent that the hydrogenated fraction is an excellent reforming charge stock, even when using the sensitive platinum-alumina catalyst. The reformed product of high octane rating is withdrawn by line 19.

The following example illustrates the invention:

A propylene feed source which is a mixture of propylene and propane containing about 56 percent by weight of propylene is fed into a polymerization reactor containing 1090 kilograms of a solid phosphoric acid containing catalyst. The average reaction temperature in the reactor is about 225° C., the pressure, about 40 atmospheres and the liquid hourly space velocity in liters of total feed per kilogram of catalyst per hour is about 2.5.

Propane and unconverted propylene are stripped from the polymerization product which is distilled into a fraction containing $C_3$ and dimers and into a higher boiling fraction. The high boiling fraction is then distilled into a fraction boiling below about 190° C. and consisting of trimer product and a fraction boiling above 190° C. The fraction boiling above 190° C. is then distilled into a tetramer product boiling between about 190° and 205° C. and a fraction boiling above 205° C. and comprising heavy polymer.

The trimer product from the polymerization is added to a 180° to 310° F. boiling range catalytically cracked gasoline with a motor octane number of about 60 and a research octane number of about 65, and containing about 60 volume percent olefins. The mixture of trimer and gasoline is subjected to catalytic hydrogenation over a fixed-bed, cobalt-molybdenum catalyst at an average temperature of about 675° F., a pressure of 600 p.s.i.g., a liquid-hourly space velocity of about 2 volumes of hydrocarbon per volume of catalyst per hour and at a hydrogen rate of about 6,000 standard cubic feet per barrel of hydrocarbon.

The hydrogenated fraction recovered is then subjected to catalytic reforming. The catalyst for this run is a pelleted, fixed-bed, platinum-alumina catalyst containing essentially about 0.6 weight percent platinum. The temperature of reaction is about 900° F., the pressure about 300 p.s.i.g. and the space velocity about 2 volumes per volume of catalyst per hour and a hydrogen concentration of about 1000 s.c.f. per bbl.

The reformate from this procedure has a motor octane number of about 90 and a research octane number of about 100. With the addition of 3 cc. of TEL the motor octane number is increased to about 95 and the research octane number to about 105. A 180° to 310° F. boiling range fraction of a catalytically cracked gasoline with trimer addition, hydrogenated and reformed above, has a motor octane number of about 85 and a research octane number of about 90.

This example illustrates the present integrated process for upgrading propylene into a tetramer useful in the manufacture of detergent alkylate and a trimer which can be hydrogenated and reformed into a valuable gasoline component.

What is claimed is:

1. A process for the upgrading of a hydrocarbon fraction consisting essentially of propylene which comprises:
    (a) contacting said hydrocarbon with a phosphoric acid polymerization catalyst under polymerization conditions;
    (b) separating from the reaction product of said contacting step a propylene tetramer fraction comprising $C_{12}$ olefins suitable for the preparation of detergent alkylate and a propylene trimer fraction comprising $C_9$ olefins;
    (c) passing said propylene trimer fraction in the presence of hydrogen into contact with a hydrogenation catalyst to effect saturation of said trimer;
    (d) passing said saturated trimer into contact with a reforming catalyst under reforming conditions to effect dehydrocyclization and aromatization of said saturated trimer; and
    (e) recovering said aromatized trimer suitable as a high octane component of motor fuel.

2. The process of claim 1 in which said Step (c) comprises passing said propylene trimer fraction into contact with a cobalt-molybdenum oxide hydrogenation catalyst in the presence of between about 1,000 to 10,000 standard cubic feet per barrel of hydrogen at a temperature of 500° to 800° F., a pressure of 200 to 800 pounds per square inch gauge, and a space velocity of about 0.25 to 5.0 pounds per hour per pound of catalyst, to effect saturation of said trimer.

3. The process of claim 1 in which Step (d) comprises passing said saturated trimer into contact with a platinum on alumina reforming catalyst in the presence of from about 1,000 to 20,000 standard cubic feet per barrel of hydrogen at a temperature from 800° to 1050° F., a pressure from 250 to 1000 pounds per square inch gauge, and a space velocity of about 0.25 to 5.0 pounds per hour per pound of catalyst, to effect dehydrocyclization and aromatization of said trimer.

4. The process of claim 1 in which said propylene trimer fraction comprising $C_9$ olefins from Step (b) is mixed with a catalytically cracked gasoline and passed into contact with said hydrogenation catalyst as recited in Step (c).

5. The process of claim 2 in which said Step (d) comprises passing said saturated trimer into contact with a platinum on alumina reforming catalyst in the presence of from about 1,000 to 20,000 standard cubic feet per barrel of hydrogen at a temperature from 800° to 1050° F., a pressure from 250 to 1000 pounds per square inch gauge, and a space velocity of about 0.25 to 5.0 pounds per hour per pound of catalyst, to effect dehydrocyclization and aromatization of said trimer.

6. The process of claim 5 in which said propylene trimer fraction comprising $C_9$ olefins from Step (b) is mixed with a catalytically cracked gasoline and passed into contact with said hydrogenation catalyst as recited in Step (c).

References Cited

UNITED STATES PATENTS

| | | | |
|---|---|---|---|
| 2,106,013 | 1/1938 | Ocon | 208—57 |
| 2,202,104 | 5/1940 | Ipatieff et al. | 260—683.15 |
| 2,243,298 | 5/1941 | Thomas | 208—49 |
| 2,630,404 | 3/1953 | Berger | 208—141 |
| 2,717,231 | 9/1955 | Lutz et al. | 208—141 |
| 2,767,124 | 10/1956 | Myers | 260—673.5 |
| 2,768,126 | 10/1956 | Haensel et al. | 208—57 |
| 3,374,282 | 3/1968 | Soderquist et al. | 260—673.5 |
| 3,442,792 | 5/1969 | Eng et al. | 208—144 |

HERBERT LEVINE, Primary Examiner

U.S. Cl. X.R.

208—57, 141, 144; 260—673.5